United States Patent
Inoue Sardenberg

(10) Patent No.: US 12,060,695 B2
(45) Date of Patent: Aug. 13, 2024

(54) SYSTEMS AND METHODS FOR IMPROVING MACHINE PERFORMANCE BASED ON MACHINE APPLICATION IDENTIFICATION

(71) Applicant: Caterpillar Inc., Peoria, IL (US)

(72) Inventor: Lucas Inoue Sardenberg, Oak Park, IL (US)

(73) Assignee: Caterpillar Inc., Peoria, IL (US)

( * ) Notice: Subject to any disclaimer, the term of this patent is extended or adjusted under 35 U.S.C. 154(b) by 483 days.

(21) Appl. No.: 17/373,351

(22) Filed: Jul. 12, 2021

(65) Prior Publication Data

US 2023/0008129 A1 Jan. 12, 2023

(51) Int. Cl.
*G06N 3/00* (2023.01)
*E02F 9/20* (2006.01)
(Continued)

(52) U.S. Cl.
CPC .............. *E02F 9/2025* (2013.01); *E02F 9/26* (2013.01); *G06F 18/214* (2023.01); *G06N 3/08* (2013.01)

(58) Field of Classification Search
CPC . E02F 9/2025; E02F 9/26; G06N 3/08; G06F 18/214; G06V 10/82; G06V 20/56; G06V 2201/06
See application file for complete search history.

(56) References Cited

U.S. PATENT DOCUMENTS 10,412,889 B2 * 9/2019 Palla ...................... H04L 67/00
10,717,200 B2 7/2020 Machida et al.
(Continued)

FOREIGN PATENT DOCUMENTS

CN 105676849 A 6/2016
CN 109165162 A 1/2019
(Continued)

OTHER PUBLICATIONS

Ali Danish et al: "Artificial intelligence, machine learning and process automation: existing knowledge frontier and way forward for mining sector", Artificial Intelligence Review, Springer Netherlands, NL, vol. 53, No. 8, Apr. 18, 2020 (Apr. 18, 2020), pp. 6025-6042, xp037252975, ISSN: 0269-2821, DOI: 10.1007/S10462-020-09841-6 [retrieved on Apr. 18, 2020]—Abstract only available.
(Continued)

Primary Examiner — Truc M Do

(57) ABSTRACT

A method for improving machine performance based on machine application identification can include training an application identification model. The method can also include receiving one or more images from a camera positioned on a machine performing an application, and feeding each of the one or more images into the trained application identification model. The trained application identification model provides a predicted application corresponding to the application being performed by the machine. The model also provides a probability that the predicted application corresponds to the application being performed by the machine. Application optimization parameters, based on the predicted application, are retrieved and distributed to the machine when the probability is greater than a selected confidence threshold.

14 Claims, 8 Drawing Sheets

(51) Int. Cl.
E02F 9/26 (2006.01)
G06F 18/214 (2023.01)
G06N 3/08 (2023.01)

(56) References Cited

U.S. PATENT DOCUMENTS

| 10,742,959 | B1* | 8/2020 | Mihal | G06T 7/85 |
| 2017/0330305 | A1* | 11/2017 | Clow | G06T 3/0031 |
| 2020/0050890 | A1* | 2/2020 | Aizawa | G06V 20/20 |
| 2020/0190963 | A1* | 6/2020 | Gooneratne | E21B 17/02 |
| 2020/0364920 | A1* | 11/2020 | Finch | G06V 10/764 |
| 2020/0410287 | A1* | 12/2020 | Chu | G06F 18/24 |

FOREIGN PATENT DOCUMENTS

| CN | 107120116 B | 1/2020 |
| CN | 110400448 B | 7/2020 |
| CN | 111989440 A | 11/2020 |
| KR | 101830331 B1 | 3/2018 |
| WO | 2020026504 A1 | 2/2020 |

OTHER PUBLICATIONS

Written Opinion and International Search Report for Int'l. Patent Appln. No. PCT/US2022/036762, mailed Oct. 19, 2022 (15 pgs).

* cited by examiner

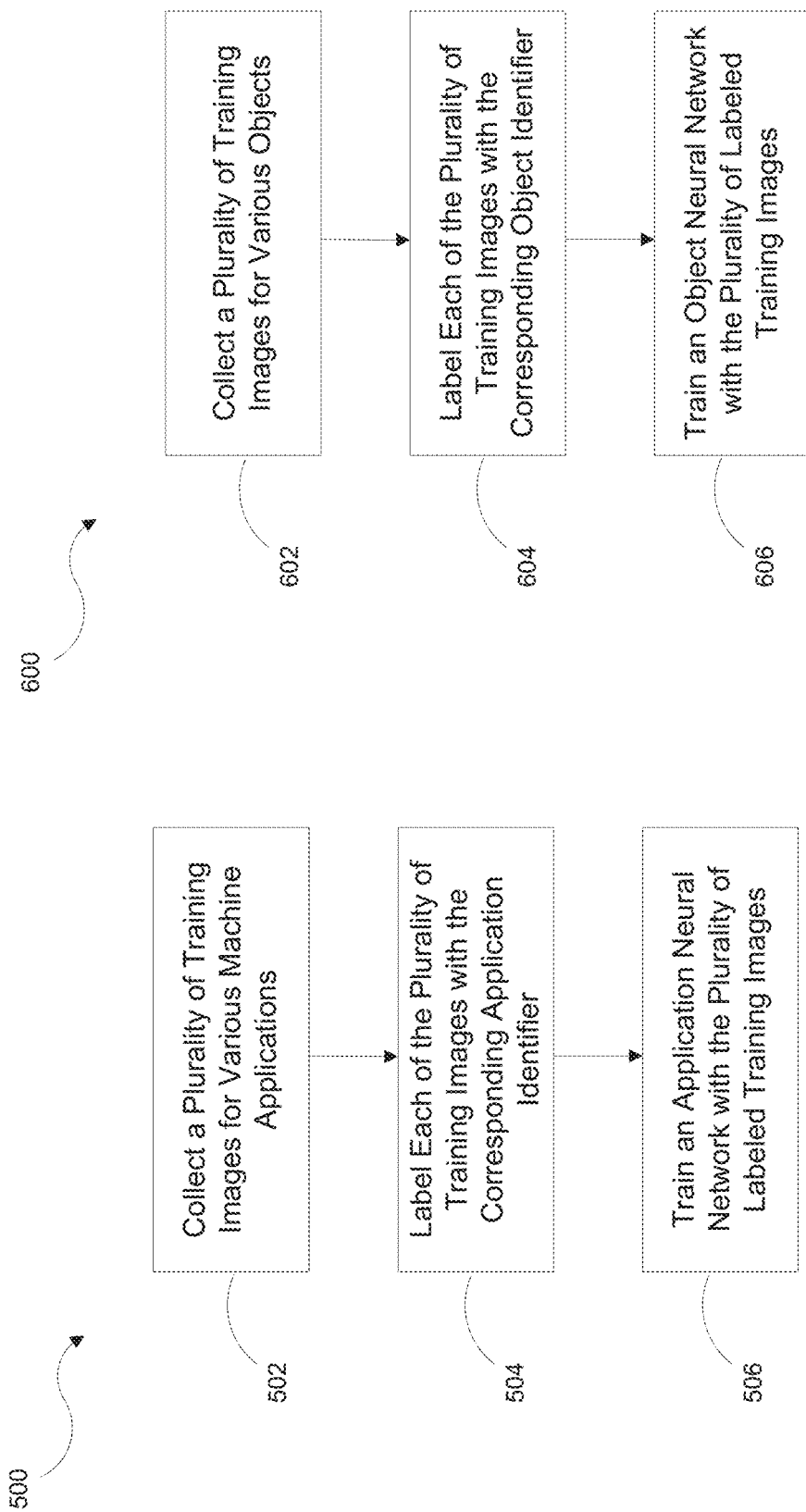

SYSTEMS AND METHODS FOR IMPROVING MACHINE PERFORMANCE BASED ON MACHINE APPLICATION IDENTIFICATION

TECHNICAL FIELD

This patent application is directed to machine application identification, and more specifically, to improving machine performance based on image based application identification.

BACKGROUND

Machines, such as excavators, can perform more than one task or application. For each one of those applications there is a combination of settings in the machine that can be optimized for best performance, fuel savings, and/or safety. Conventionally, the machine operator is depended on to adjust the appropriate machine parameters, which in many cases is not done.

Efforts have been made to optimize machine performance for known applications using image data. For example, CN107120116B to Songyong et al., (hereinafter "Songyong") describes a method of adjusting the height of a coal mining machine cutting drum using image data. Specifically, images of a coal and rock face are processed to identify where the coal is located on the rock face. This is accomplished primarily with edge detection to locate the coal-rock interface. The height of the cutting drum is adjusted based on the located coal-rock interface to maximize coal production and limit damage to the cutting drum.

Songyong is directed to optimizing performance by adjusting one parameter of an application specific machine (i.e., coal mining machine). Thus, Songyong is not capable of identifying one of many possible applications that can be performed by multi-use machines. Furthermore, the image processing techniques described in Songyong, namely edged detection are insufficient to identify different applications performed by multi-use machines, such as excavators.

Thus, there is a need for systems and methods to automatically optimize machine performance based on application identification using images. The example systems and methods described herein are directed toward overcoming one or more of the deficiencies described above and/or other problems with the prior art.

SUMMARY

In some embodiments, a method for improving machine performance based on machine application identification can include training an application identification model. The method can also include receiving one or more images from a camera positioned on a machine performing an application, and feeding each of the one or more images into the trained application identification model. The trained application identification model provides a predicted application corresponding to the application being performed by the machine. The model also provides a probability that the predicted application corresponds to the application being performed by the machine. Application optimization parameters, based on the predicted application, are retrieved and distributed to the machine when the probability is greater than a selected confidence threshold.

In some aspects, training the application identification model includes collecting a plurality of training images for each of a plurality of applications, labeling each of the plurality of training images with a corresponding one of a plurality of application identifiers, and training an application neural network with the plurality of labeled training images. In further aspects, training the application identification model, further comprises training an object identification model, including collecting a plurality of training object images for each of a plurality of objects, labeling each of the plurality of training object images with a corresponding one of a plurality of object identifiers, and training an object neural network with the plurality of labeled training object images. According to some aspects, the method can further comprise receiving from the trained application neural network, an application identifier corresponding to the application being performed by the machine and an application probability that the application identifier corresponds to the application being performed by the machine. In further aspects, the method can further comprise receiving from the trained object neural network, an object identifier corresponding to an object in the one or more images and an object probability that the object identifier corresponds to the object. In some aspects, the predicted application and the probability are based on the received application identifier, application probability, object identifier, and object probability. According to further aspects, the method can further comprise, when the probability is less than the selected confidence threshold, receiving additional images from the camera and feeding the additional images into the trained application identification model until the probability is greater than the selected confidence threshold. In some aspects, the selected confidence threshold is selected based on a type of the machine. In some aspects, the application optimization parameters include at least one of hydraulic pressure, fuel metering, or gear shift limits.

In some embodiments, a system for improving machine performance based on machine application identification can include one or more cameras positioned on a machine, one or more processors, and one or more memory devices having instructions stored thereon. When executed, the instructions cause the one or more processors to train an application identification model. The instructions can also cause the one or more processors to receive one or more images from the one or more cameras, and feed each of the one or more images into the trained application identification model. A predicted application corresponding to an application being performed by the machine is received from the trained model and a probability that the predicted application corresponds to the application being performed by the machine is received from the model. The instructions can further cause the one or more processors to retrieve application optimization parameters based on the predicted application and distribute the retrieved application optimization parameters to the machine when the probability is greater than a selected confidence threshold.

In some embodiments, one or more non-transitory computer-readable media storing computer-executable instructions that, when executed by one or more processors, cause the one or more processors to perform operations. The operations can include training an application identification model. The operations can also include receiving one or more images from a camera positioned on a machine performing an application, and feeding each of the one or more images into the trained application identification model. The operations can further include receiving, from the trained application identification model, a predicted application corresponding to the application being performed by the machine and a probability that the predicted application corresponds to the application being performed by the machine. The operations can also include retrieving application optimization parameters based on the predicted application and distributing the retrieved application optimization parameters to the machine when the probability is greater than a selected confidence threshold.

BRIEF DESCRIPTION OF THE DRAWINGS

The systems and methods described herein may be better understood by referring to the following Detailed Description in conjunction with the accompanying drawings, in which like reference numerals indicate identical or functionally similar elements:

FIG. 5 is a flow diagram showing a method for training an application neural network of an application identification model according to some embodiments of the disclosed technology;

FIG. 6 is a flow diagram showing a method for training an object neural network of an application identification model according to some embodiments of the disclosed technology;

Figure 1:
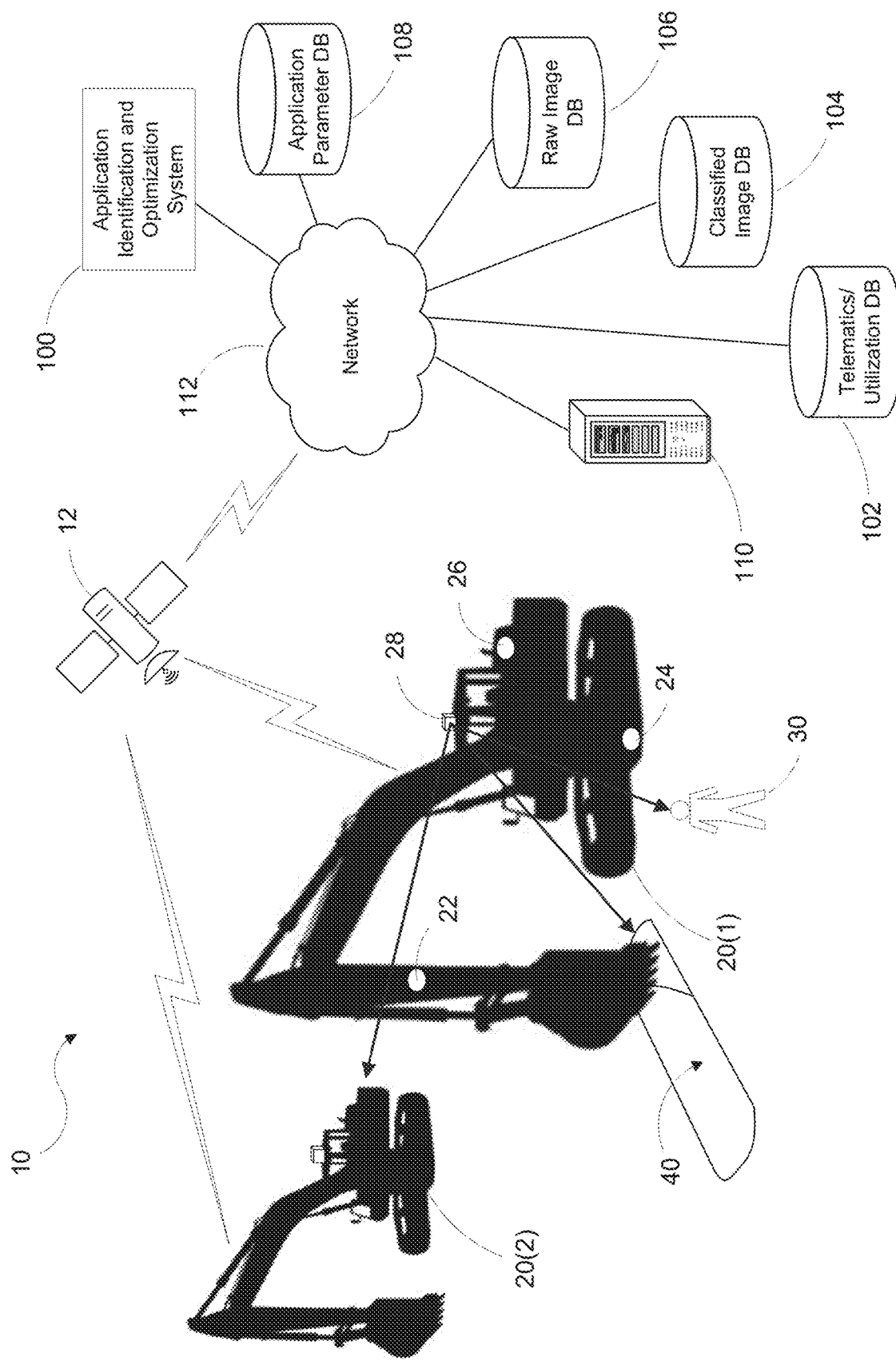
FIG. 1 is a diagram illustrating an overview of an environment in which some implementations can operate according to embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates an environment 10 in which some implementations of the application identification and optimization system 100 can operate according to embodiments of the disclosed technology. The system environment 10 can include multiple machines, such as excavators 20(1) and 20(2), a satellite 12, telematics/utilization database 102, a classified image database 104, a raw image database 106, an application parameter database 108, a telematics processing system 110, and a network 112. The application identification and optimization system 100 can be connected to the telematics/utilization database 102, the classified image database 104, the raw image database 106, the application parameter database 108, and the telematics processing system 110 via network 112.

The raw image database 106 and the application identification and optimization system 100 can receive images from one or more cameras 28 positioned on each excavator 20(1) and 20(2) via satellite 12. The telematics/utilization database 102 and the telematics processing system 110 can receive telematics data from the excavators 20(1) and 20(2) via satellite 12. The telematics data can include sensor data from the excavators, such as from a pressure sensor 22, a vibration sensor 24, and a temperature sensor 26, to name a few. In some embodiments, the images and telematics data can also be received via cellular, wi-fi, or other wireless communication.

In some embodiments, the telematics processing system 110 determines a machine utilization pattern for the machines based on the telematics data. For example, a machine learning model (such as a neural network) can be applied to estimate each machine's utilization pattern based on telematics data (i.e., telemetry data). As an example, an excavator can have a use pattern of activities including 50% mass excavation, 20% grading, and 30% tracking (i.e., traveling from place to place).

In some embodiments, a utilization model can use mathematical models that classify equipment activity or application frequencies, which can include regression, support vector machines, and neural nets, depending on the level of detail and complexity required. These models may differentiate between, for example, mass excavation, dirt moving, scraping, grading, loading, tracking, or idle time. Models may supplement standard telematics data with additional sensors to measure the intensity of use.

The images from cameras 28 can be used in addition to or in lieu of the telematics data to identify an application being performed by a machine. As shown in FIG. 1, cameras 28 can provide additional information from the surrounding environment 10 that can help identify an application, or activity, being performed by the machine. For example, the camera 28 on excavator 20(1) can identify other equipment, such as excavator 20(2), people 30, and landscape features, such as trench 40, dirt piles, ditches, and/or roads, for example. This type of information may be difficult to determine from telematics sensor data. In some implementations, the images from cameras 28 can be correlated with the telematics data. Many machines do not have telematics capability, in these cases the disclosed application identification and optimization systems can rely solely on image data.

The cameras 28 can be any type of analog or digital image sensor, digital camera, and/or digital video camera. For example, the cameras 28 can be a high dynamic range (HDR) camera, a light-sensitive camera, and/or an ultrasonic camera. In some embodiments, the cameras may provide two-dimensional image data, three-dimensional image data, image sequences, gray image data, and/or color image data. In some embodiments, the system 100 can further include any known type of sensor, such as one or more light detection and ranging (LIDAR) sensors, one or more sound navigation ranging (SONAR) sensors, one or more radio detection and ranging (RADAR) sensors, or any other suitable sensor type. In some embodiments, the cameras 28 can be added to the machines or can be originally provided on the machine from the manufacturer.

Figure 2:
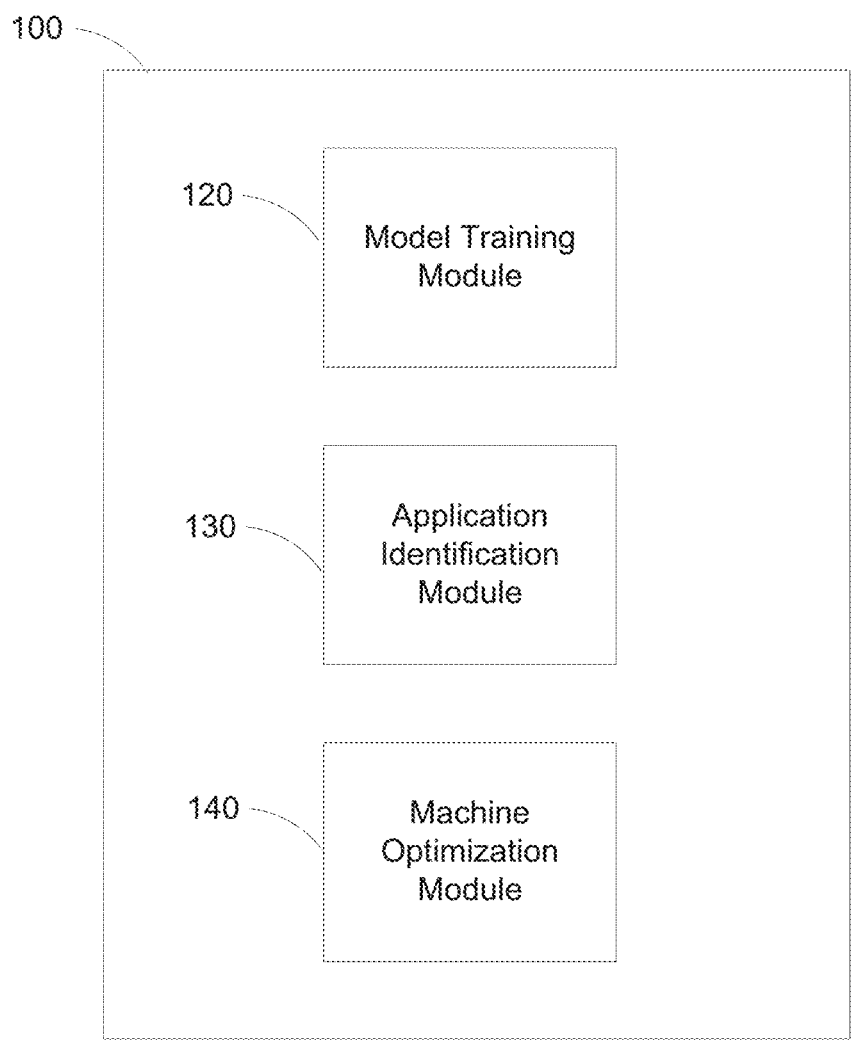
FIG. 2 is a block diagram illustrating an overview of a machine identification and optimization system according to some embodiments of the disclosed technology.

As shown in FIG. 2, the application identification and optimization system 100 can comprise a model training module 120, an application identification module 130, and a machine optimization module 140. In some embodiments, the model training module 120 can be configured to receive a plurality of training images for each of a plurality of applications and objects from the classified images database 104. Each of the images can be labeled with a corresponding one of a plurality of application identifiers and object identifiers. The model training module 120 can be configured to train an application neural network and an object neural network with the plurality of labeled training images.

In some embodiments, the application identification module 130 is configured to receive one or more images from the raw image database 106 and/or camera 28 positioned on a machine 10 performing an application. The module 130 feeds each of the one or more images into the trained application identification model. In some embodiments, the application identification module 130 receives, from the trained application identification model, a predicted application corresponding to the application being performed by the machine 10 and a probability that the predicted application corresponds to the application being performed by the machine 10.

In some embodiments, the machine optimization module 140 is configured to retrieve application optimization parameters from the application parameter database 108 based on the predicted application and distribute the retrieved application optimization parameters to the machine 10 when the probability is greater than a selected confidence threshold. In some embodiments, the threshold can be set at 90%, for example.

Figure 3:
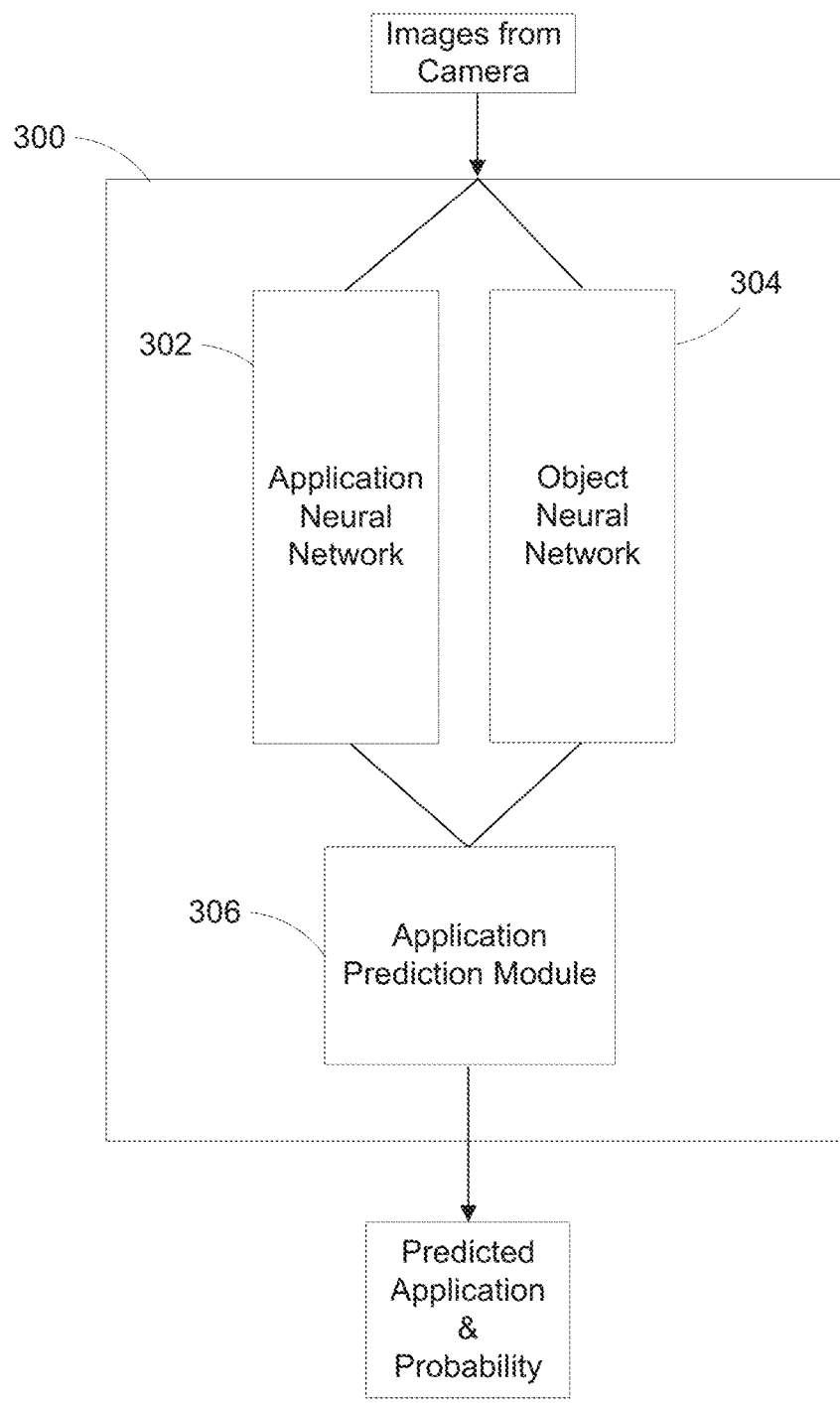
FIG. 3 is a block diagram illustrating an overview of a machine application identification model according to some embodiments of the disclosed technology.

FIG. 3 is a block diagram illustrating an overview of a machine application identification model 300 according to some embodiments of the disclosed technology. The machine application identification model 300 can include an application identification neural network 302, an object identification neural network 304, and an application prediction module 306. One or more raw images from the camera 28 and/or the raw image database 106 are fed into the trained application neural network 302 and the trained object neural network 304. The application identification neural network 302 outputs an application identifier corresponding to the application being performed by the machine and an application probability that the application identifier corresponds to the application being performed by the machine. The object identification neural network 304 outputs an object identifier corresponding to an object in the one or more images and an object probability that the object identifier corresponds to the object. The application prediction module 306 combines the application identifier, application probability, object identifier, and object probability in order to output a predicted application and a probability that the predicted application corresponds to the application being performed by the machine.

The application identifier, application probability, object identifier, and object probability can be combined in order to provide the maximum confidence level that a machine is performing a certain application. A set of rules and mathematical weights can be applied to each identifier and its respective probability in combination. The results are classified using a decision tree algorithm. This process works on individual raw images and loops over time accumulating application and probability results. If results are changing more often than a set threshold, the loop continues to process additional images to reach an acceptable consistency metric, which is then transformed into the application and object identification and corresponding probabilities for each.

Figure 4:
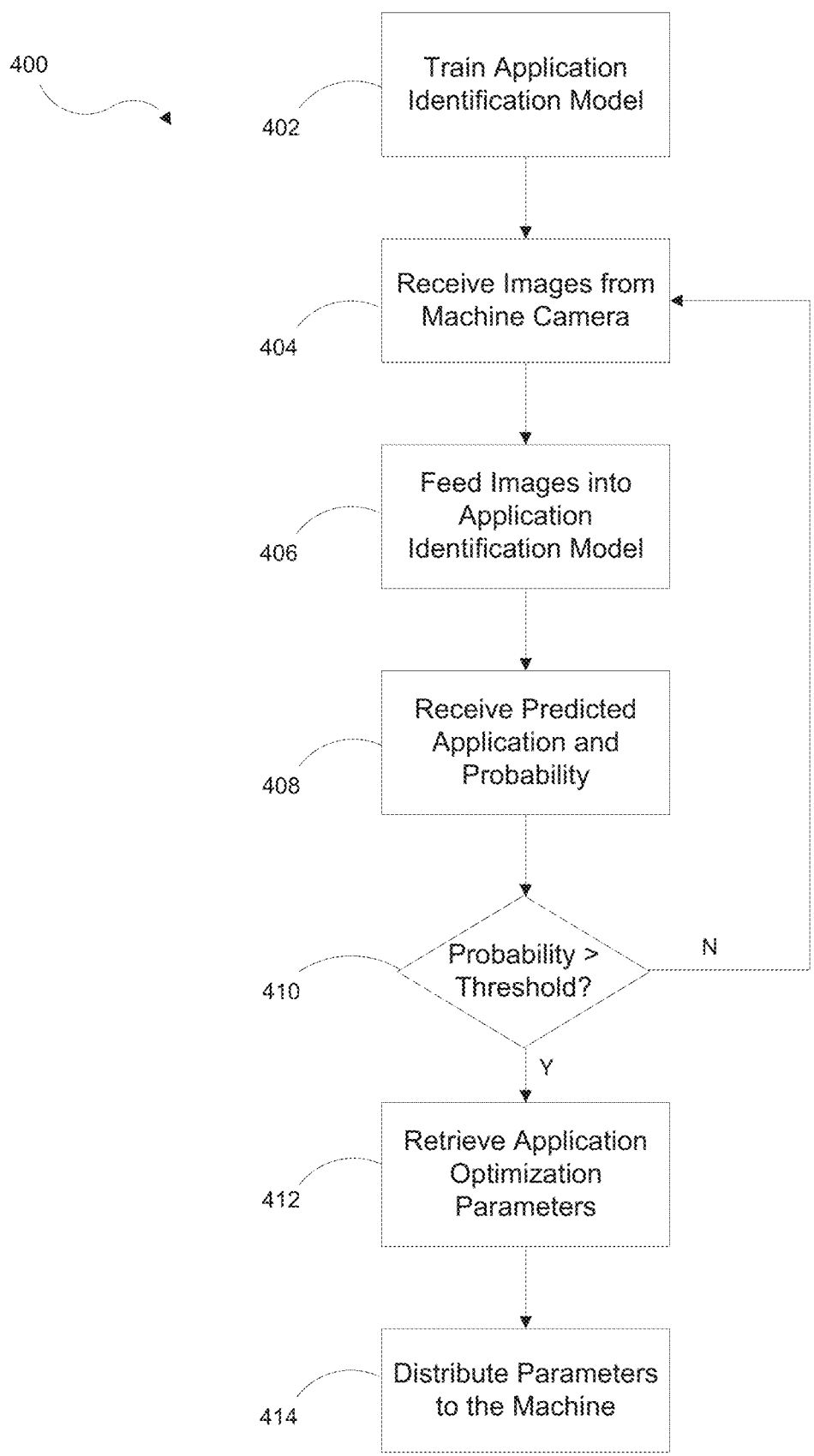
FIG. 4 is a flow diagram showing a method for machine application identification and optimization according to some embodiments of the disclosed technology.

FIG. 4 is a flow diagram showing a method 400 for machine application identification and optimization according to some embodiments of the disclosed technology. The method 400 can include training an application identification model at step 402, which is further described below with respect to FIGS. 5 and 6. One or more images are received from a camera positioned on a machine performing an application at step 404. At step 406 the images are fed into a trained application identification model, such as the machine application identification model 300 described above with respect to FIG. 3. At step 408, a predicted application corresponding to the application being performed by the machine and a probability that the predicted application corresponds to the application being performed by the machine are received from the trained application identification model. At step 410, it is determined whether the probability that the predicted application corresponds to the application being performed by the machine is greater than a selected threshold. When the probability is greater than the selected threshold at step 410, application optimization parameters are retrieved based on the predicted application at step 412 and distributed to the machine at step 414. When the probability is less than the selected confidence threshold at step 410, the method includes receiving additional images from the camera at step 404 and feeding the additional images into the trained application identification model at step 406 until the probability is greater than the selected confidence threshold. The entire process can run in a loop until the machine is turned off in order to constantly identify what application the machine is performing and adjust the machine accordingly. In some embodiments, the selected confidence threshold is selected based on a type of the machine. In some embodiments, the application optimization parameters include at least one of hydraulic pressure, fuel metering, and/or gear shift limits, for example.

FIG. 5 is a flow diagram showing a method 500 for training an application neural network of an application identification model according to some embodiments of the disclosed technology. The method 500 can include collecting a plurality of training images for each of a plurality of applications at step 502. At step 504, each of the plurality of training images is labeled with a corresponding one of a plurality of application identifiers. At step 506, the method includes training an application neural network with the plurality of labeled training images.

FIG. 6 is a flow diagram showing a method 600 for training an object neural network of an application identification model according to some embodiments of the disclosed technology. The method 600 can include collecting a plurality of training object images for each of a plurality of objects at step 602. At step 604, each of the plurality of training object images is labeled with a corresponding one of a plurality of object identifiers. At step 606, the method includes training an object neural network with the plurality of labeled training object images.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 7:
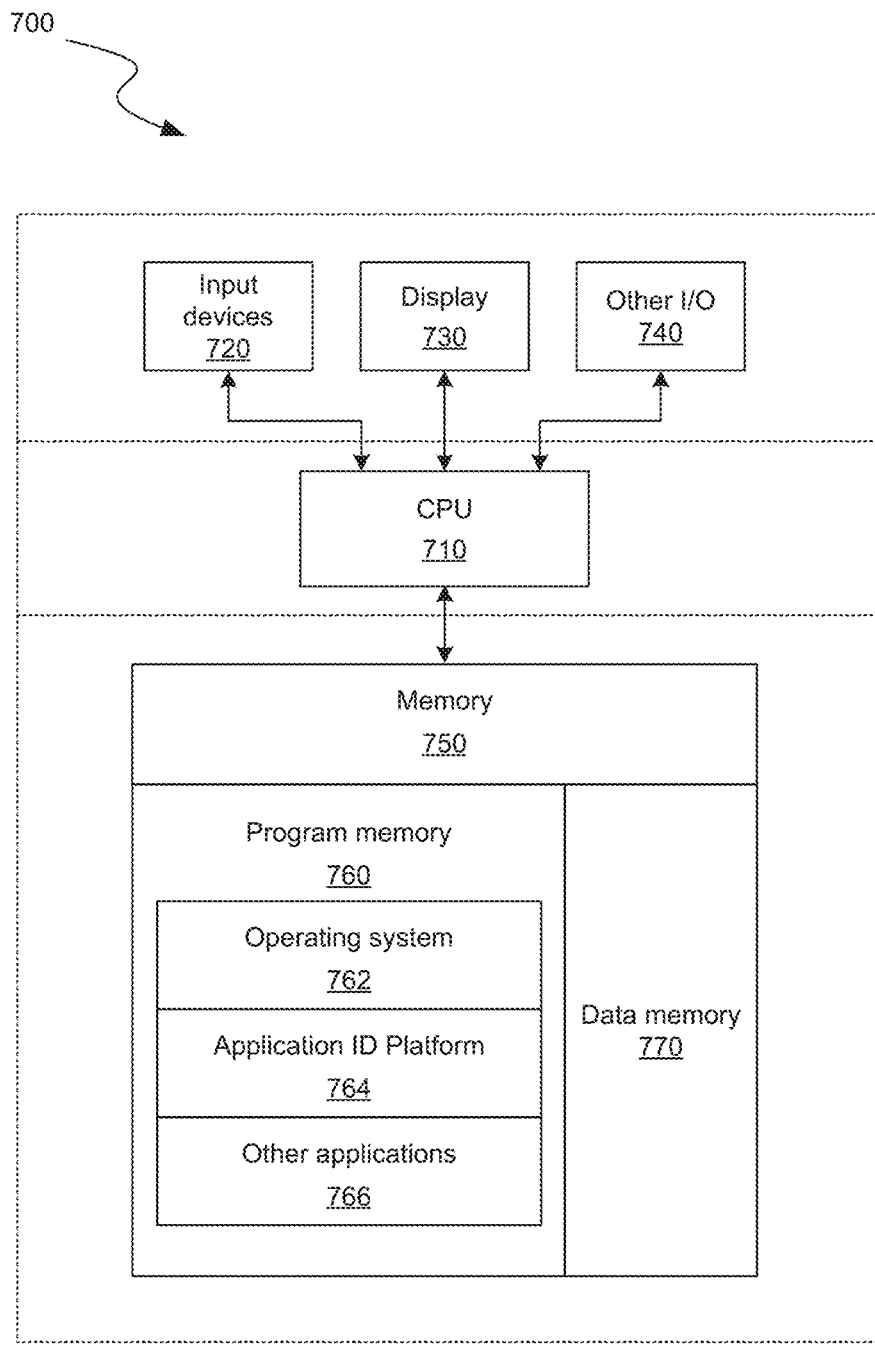
FIG. 7 is a block diagram illustrating an overview of devices on which some implementations can operate.

Several implementations are discussed below in more detail in reference to the figures. FIG. 7 is a block diagram illustrating an overview of devices on which some implementations of the disclosed technology can operate. The devices can comprise hardware components of a device 700 that performs application identification, for example. Device 700 can include one or more input devices 720 that provide input to the CPU (processor) 710, notifying it of actions. The actions are typically mediated by a hardware controller that interprets the signals received from the input device and communicates the information to the CPU 710 using a communication protocol. Input devices 720 include, for example, a mouse, a keyboard, a touchscreen, an infrared sensor, a touchpad, a wearable input device, a camera- or image-based input device, a microphone, or other user input devices.

CPU 710 can be a single processing unit or multiple processing units in a device or distributed across multiple devices. CPU 710 can be coupled to other hardware devices, for example, with the use of a bus, such as a PCI bus or SCSI bus. The CPU 710 can communicate with a hardware controller for devices, such as for a display 730. Display 730 can be used to display text and graphics. In some examples, display 730 provides graphical and textual visual feedback to a user. In some implementations, display 730 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 740 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 700 also includes a communication device capable of communicating wirelessly or wire-based with a network node. The communication device can communicate with another device or a server through a network using, for example, TCP/IP protocols. Device 700 can utilize the communication device to distribute operations across multiple network devices.

The CPU 710 can have access to a memory 750. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 750 can include program memory 760 that stores programs and software, such as an operating system 762, Application Identification Platform 764, and other application programs 766. Memory 750 can also include data memory 770 that can include database information, etc., which can be provided to the program memory 760 or any element of the device 700.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 8:
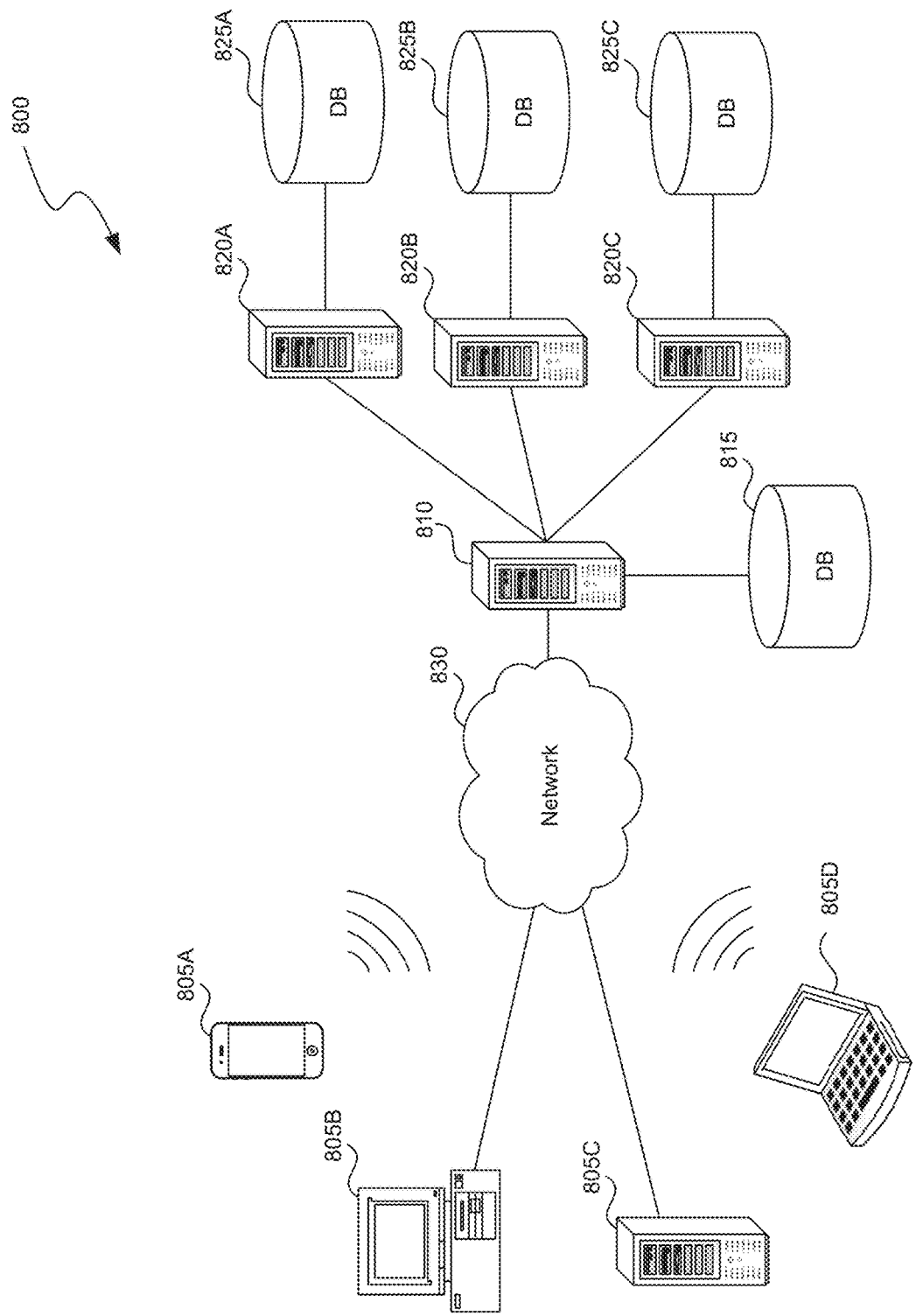
FIG. 8 is a block diagram illustrating an overview of an environment in which some implementations can operate.

FIG. 8 is a block diagram illustrating an overview of an environment 800 in which some implementations of the disclosed technology can operate. Environment 800 can include one or more client computing devices 805A-D, examples of which can include device 700. Client computing devices 805 can operate in a networked environment using logical connections through network 830 to one or more remote computers, such as a server computing device 810.

In some implementations, server computing device 810 can be an edge server that receives client requests and coordinates fulfillment of those requests through other servers, such as servers 820A-C. Server computing devices 810 and 820 can comprise computing systems, such as device 700. Though each server computing device 810 and 820 is displayed logically as a single server, server computing devices can each be a distributed computing environment encompassing multiple computing devices located at the same or at geographically disparate physical locations. In some implementations, each server computing device 820 corresponds to a group of servers.

Client computing devices 805 and server computing devices 810 and 820 can each act as a server or client to other server/client devices. Server 810 can connect to a database 815. Servers 820A-C can each connect to a corresponding database 825A-C. As discussed above, each server 820 can correspond to a group of servers, and each of these servers can share a database or can have their own database. Databases 815 and 825 can warehouse (e.g., store) information. Though databases 815 and 825 are displayed logically as single units, databases 815 and 825 can each be a distributed computing environment encompassing multiple computing devices, can be located within their corresponding server, or can be located at the same or at geographically disparate physical locations.

Network 830 can be a local area network (LAN) or a wide area network (WAN), but can also be other wired or wireless networks. Network 830 may be the Internet or some other public or private network. Client computing devices 805 can be connected to network 830 through a network interface, such as by wired or wireless communication. While the connections between server 810 and servers 820 are shown as separate connections, these connections can be any kind of local, wide area, wired, or wireless network, including network 830 or a separate public or private network.

Figure 9:
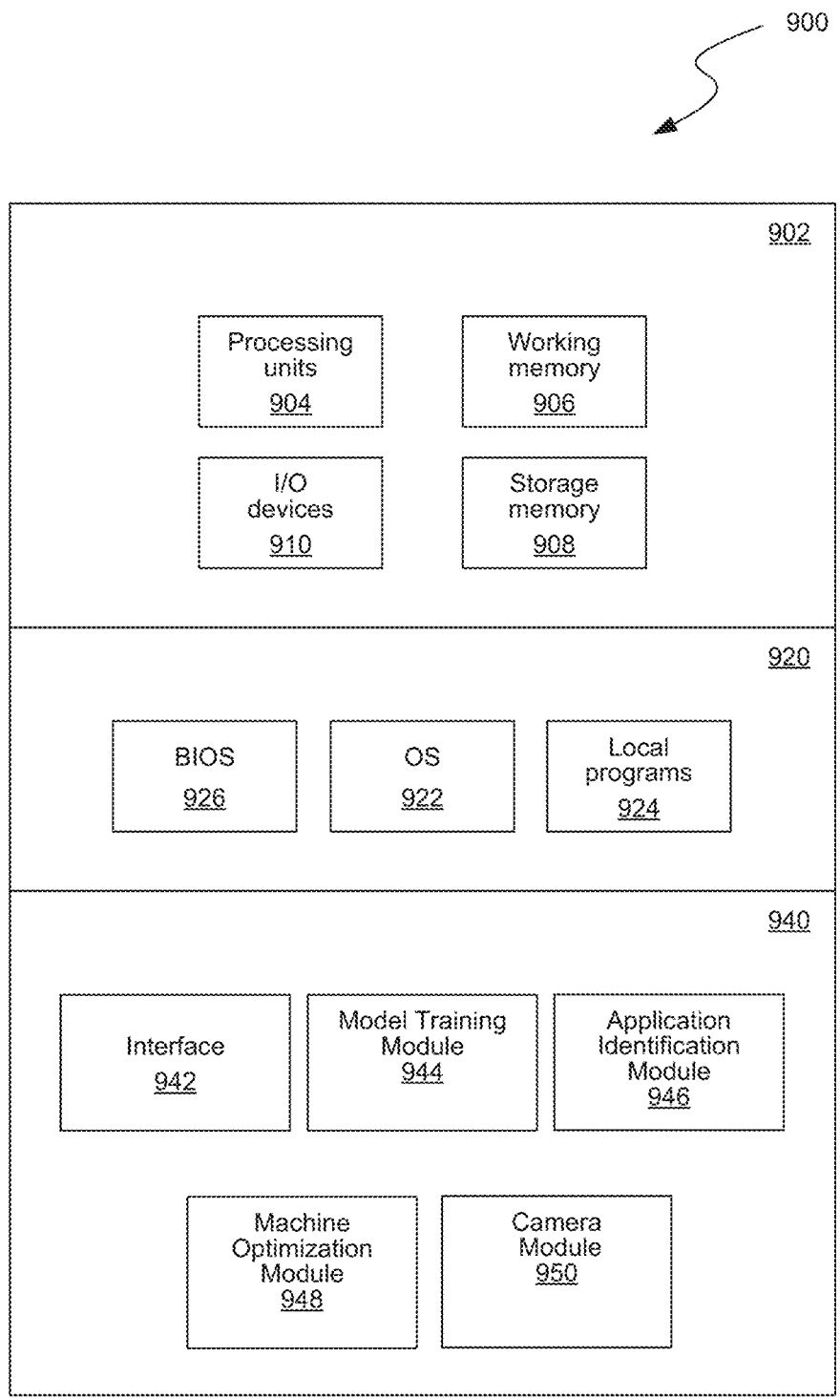
FIG. 9 is a block diagram illustrating components which, in some implementations, can be used in a system employing the disclosed technology.

FIG. 9 is a block diagram illustrating components 900 which, in some implementations, can be used in a system employing the disclosed technology. The components 900 include hardware 902, general software 920, and specialized components 940. As discussed above, a system implementing the disclosed technology can use various hardware, including processing units 904 (e.g., CPUs, GPUs, APUs, etc.), working memory 906, storage memory 908, and input and output devices 910. Components 900 can be implemented in a client computing device such as client computing devices 805 or on a server computing device, such as server computing device 810 or 820.

General software 920 can include various applications, including an operating system 922, local programs 924, and a basic input output system (BIOS) 926. Specialized components 940 can be subcomponents of a general software application 920, such as local programs 924. Specialized components 940 can include a Model Training Module 944, an Application Identification Module 946, a Machine Optimization Module 948, a Camera Module 950, and components that can be used for transferring data and controlling the specialized components, such as Interface 942. In some implementations, components 900 can be in a computing system that is distributed across multiple computing devices or can be an interface to a server-based application executing one or more of specialized components 940.

Those skilled in the art will appreciate that the components illustrated in FIGS. 7-9 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

INDUSTRIAL APPLICABILITY

In some embodiments, a machine application and optimization system 100 can include a model training module 944, an application identification module 946, a machine optimization module, and a camera module 950 (FIG. 9). In operation, the model training module 944 can train an application identification model 300 by collecting a plurality of training images for each of a plurality of applications and labeling the images with a corresponding one of a plurality of application identifiers. In some embodiments, these labeled images can be stored in and retrieved from the classified image database 104. Training the application identification model 300 can include training an application neural network 302 with the plurality of labeled training images. In some embodiments, training the application identification model can include collecting a plurality of training object images for each of a plurality of objects and labeling the images with a corresponding one of a plurality of object identifiers. In some embodiments, these labeled object images can be stored in and retrieved from the classified image database 104. An object neural network 304 is then trained with the plurality of labeled training object images.

The application identification module 946 can include the trained application identification model 300. The module 946 can receive one or more images directly from the camera 28 positioned on the machine 20(1) performing an application (e.g., digging a trench 40). In some embodiments the images from camera 28 can be stored in and retrieved from the raw image database 106. The images are fed into the trained application identification model 300 and the model outputs a predicted application corresponding to the application being performed by the machine and a probability that the predicted application corresponds to the application being performed by the machine.

When the probability is greater than the selected threshold, the machine optimization module 948 retrieves the corresponding application optimization parameters from the application parameter database 108 and distributes the parameter to the machine. When the probability is less than the selected confidence threshold, additional images are retrieved from the camera 28 and fed into the trained application identification model 300 until the probability is greater than the selected confidence threshold.

In some embodiments, the machine application and optimization system 100 can include a camera module 950. The camera module 950 can retrieve images from the cameras 28 and store the raw images in the raw image database 106. In some embodiments the camera module 950 can perform pre-processing on the images to improve picture quality, such a filtering and contrast adjustments, for example.

In an example application, the system can recognize via images that the machine is lifting a heavy object (e.g., a trench box). The system can optimize the machine by enabling a "heavy lift" mode, for example. This mode configures the machine to have finer controls and warnings if the object is positioned outside machine safety parameters (e.g., possibility of tipping). In another example, the system can recognize via images that the machine is dumping material in a trench. The system can optimize the machine by enabling finer control of the implement, for example. In addition, the system can detect the trench and nearby personnel, applying brakes automatically to avoid the machine moving forward.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A method for improving machine performance based on machine application identification, comprising:
   training an application identification model, comprising:
      collecting a plurality of training images for each of a plurality of applications,
      labeling each of the plurality of training images with a corresponding one of a plurality of application identifiers, and
      training an application neural network with the plurality of labeled training images;
   receiving one or more images from a camera positioned on a machine performing an application;
   feeding each of the one or more images into the trained application identification model;
   receiving, from the trained application identification model, a predicted application corresponding to the application being performed by the machine and a probability that the predicted application corresponds to the application being performed by the machine;
   retrieving application optimization parameters based on the predicted application and distribute the retrieved application optimization parameters to the machine when the probability is greater than a selected confidence threshold;
   training an object identification model, comprising:
      collecting a plurality of training object images for each of a plurality of objects,
      labeling each of the plurality of training object images with a corresponding one of a plurality of object identifiers, and
      training an object neural network with the plurality of labeled training object images;
   receiving from the trained application neural network, an application identifier corresponding to the application being performed by the machine and an application probability that the application identifier corresponds to the application being performed by the machine; and
   receiving from the trained object neural network, an object identifier corresponding to an object in the one or more images and an object probability that the object identifier corresponds to the object.

2. The method of claim 1, wherein the predicted application and the probability are based on the received application identifier, application probability, object identifier, and object probability.

3. The method of claim 1, further comprising, when the probability is less than the selected confidence threshold, receiving additional images from the camera and feeding the additional images into the trained application identification model until the probability is greater than the selected confidence threshold.

4. The method of claim 1, wherein the selected confidence threshold is selected based on a type of the machine.

5. The method of claim 1, wherein the application optimization parameters include at least one of hydraulic pressure, fuel metering, or gear shift limits.

6. A system for improving machine performance based on machine application identification, comprising:
   one or more cameras positioned on a machine;
   one or more processors; and
   one or more memory devices having stored thereon instructions that when executed by the one or more processors cause the one or more processors to:
      train an application identification model, comprising:
         collecting a plurality of training images for each of a plurality of applications,
         labeling each of the plurality of training images with a corresponding one of a plurality of application identifiers, and
         training an application neural network with the plurality of labeled training images;
      receive one or more images from the one or more cameras;
      feed each of the one or more images into the trained application identification model;
      receive, from the trained application identification model, a predicted application corresponding to an application being performed by the machine and a probability that the predicted application corresponds to the application being performed by the machine;
      retrieve application optimization parameters based on the predicted application and distribute the retrieved application optimization parameters to the machine when the probability is greater than a selected confidence threshold;
      train an object identification model, comprising:
         collecting a plurality of training object images for each of a plurality of objects,
         labeling each of the plurality of training object images with a corresponding one of a plurality of object identifiers, and
         training an object neural network with the plurality of labeled training object images;
      receive, from the trained application neural network, an application identifier corresponding to the application being performed by the machine and an application probability that the application identifier corresponds to the application being performed by the machine; and
      receive, from the trained object neural network, an object identifier corresponding to an object in the one or more images and an object probability that the object identifier corresponds to the object.

7. The system of claim 6, wherein the predicted application and the probability are based on the received application identifier, application probability, object identifier, and object probability.

8. The system of claim 6, further comprising, when the probability is less than the selected confidence threshold, receiving additional images from the one or more cameras and feeding the additional images into the trained application identification model until the probability is greater than the selected confidence threshold.

9. The system of claim 6, wherein the selected confidence threshold is selected based on a type of the machine.

10. The system of claim 6, wherein the application optimization parameters include at least one of hydraulic pressure, fuel metering, or gear shift limits.

11. One or more non-transitory computer-readable media storing computer-executable instructions that, when executed by one or more processors, cause the one or more processors to perform operations comprising:
   training an application identification model, comprising:
      collecting a plurality of training images for each of a plurality of applications,
      labeling each of the plurality of training images with a corresponding one of a plurality of application identifiers, and
      training an application neural network with the plurality of labeled training images;
   receiving one or more images from a camera positioned on a machine performing an application;
   feeding each of the one or more images into the trained application identification model;
   receiving, from the trained application identification model, a predicted application corresponding to the application being performed by the machine and a probability that the predicted application corresponds to the application being performed by the machine;
   retrieving application optimization parameters based on the predicted application and distribute the retrieved application optimization parameters to the machine when the probability is greater than a selected confidence threshold;
   training an object identification model, comprising:
      collecting a plurality of training object images for each of a plurality of objects,
      labeling each of the plurality of training object images with a corresponding one of a plurality of object identifiers, and
      training an object neural network with the plurality of labeled training object images;
   receiving from the trained application neural network, an application identifier corresponding to the application being performed by the machine and an application probability that the application identifier corresponds to the application being performed by the machine; and
   receiving from the trained object neural network, an object identifier corresponding to an object in the one or more images and an object probability that the object identifier corresponds to the object.

12. The one or more non-transitory computer-readable media of claim 11,
   wherein the predicted application and the probability are based on the received application identifier, application probability, object identifier, and object probability.

13. The one or more non-transitory computer-readable media of claim 11, further comprising, when the probability is less than the selected confidence threshold, receiving additional images from the camera and feeding the additional images into the trained application identification model until the probability is greater than the selected confidence threshold.

14. The one or more non-transitory computer-readable media of claim 11, wherein the application optimization parameters include at least one of hydraulic pressure, fuel metering, or gear shift limits.

* * * * *